No. 797,231. PATENTED AUG. 15, 1905.
J. F. SCANLAN.
BICYCLE SEAT SUPPORT AND PUMP.
APPLICATION FILED SEPT. 4, 1903.
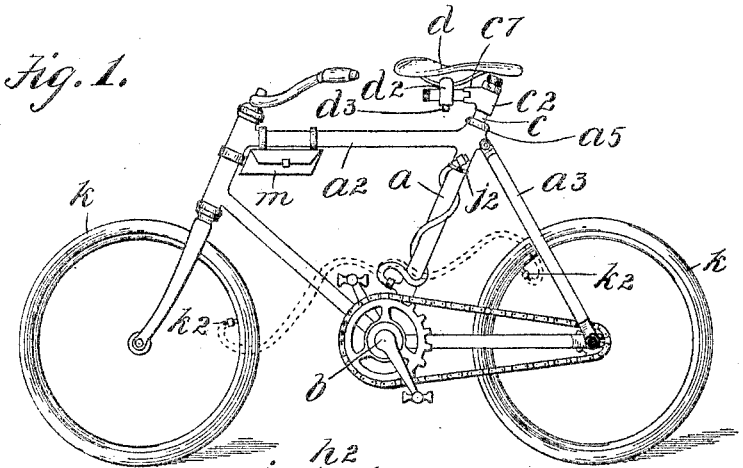
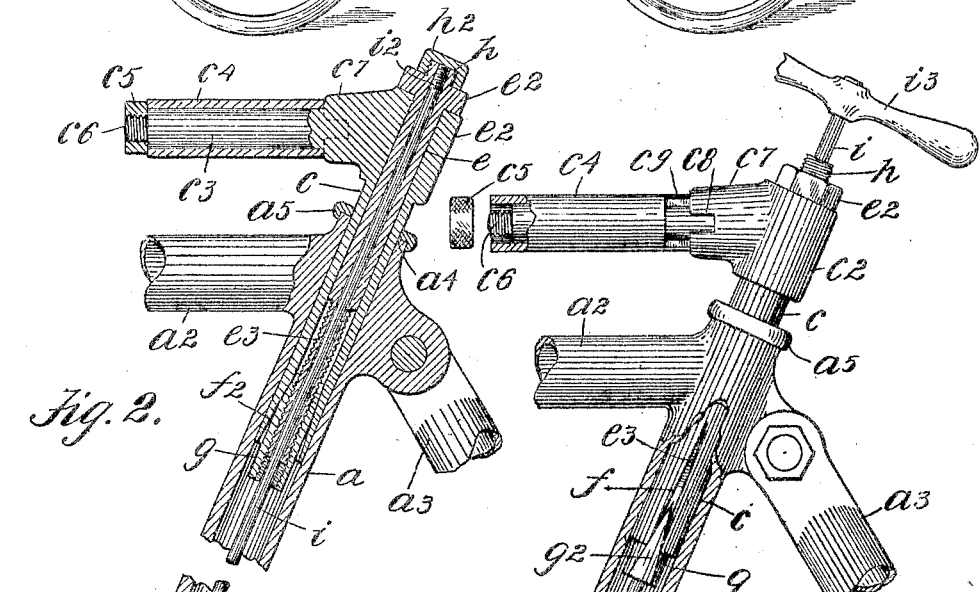
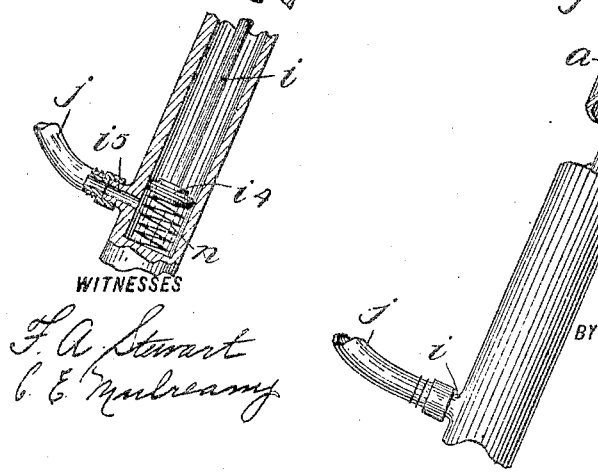
INVENTOR
Joseph F. Scanlan

UNITED STATES PATENT OFFICE.

JOSEPH F. SCANLAN, OF BROOKLYN, NEW YORK.

BICYCLE SEAT-SUPPORT AND PUMP.

No. 797,231.      Specification of Letters Patent.      Patented Aug. 15, 1905.

Application filed September 4, 1903. Serial No. 171,856.

*To all whom it may concern:*

Be it known that I, JOSEPH F. SCANLAN, a citizen of the United States, residing at Brooklyn, in the county of Kings and State of New York, have invented certain new and useful Improvements in Bicycle Seat-Supports and Pumps, of which the following is a specification, such as will enable those skilled in the art to which it appertains to make and use the same.

This invention relates to bicycles; and the object thereof is to provide an improved seat-support for vehicles of this class and also to provide improved means for inflating the pneumatic tires thereof; and with these and other objects in view the invention consists in the construction, combination, and arrangement of parts hereinafter described and claimed.

The invention is fully disclosed in the following specification, of which the accompanying drawings form a part, in which the separate parts of my improvement are designated by suitable reference characters in each of the views, and in which—

Figure 1 is a side view of a bicycle provided with my improvement; Fig. 2, a sectional side view of that part of the bicycle-frame with which my improvement is connected, and Fig. 3 a side view of the same part of the frame shown in Fig. 2 with parts thereof broken away.

In the drawings forming part of this specification I have shown a bicycle provided with what is known as the "diamond frame," having a tubular member $a$, which extends upwardly and backwardly from the hanger in which the pedal-shaft $b$ is supported and with the top portion of which is connected the top horizontal frame member $a^2$ and the rear fork $a^3$. The upright tubular frame member $a$ is open at the top, as shown at $a^4$, and is preferably provided with a finishing-cap $a^5$, and in the practice of my invention I provide a seat or saddle post which comprises a tube $c$, adapted to be inserted into the frame member $a$ and provided at its upper end with an enlarged head portion $c^2$, having a forwardly-directed shank $c^3$, on which is placed a sleeve $c^4$, which is held on the shank $c^3$ by a thumb-nut or similar device $c^5$, which is screwed onto a reduced screw-threaded extension $c^6$ of the shank $c^3$.

The head $c^2$ of the tube $c$ is provided with a forwardly-directed member $c^7$, in the opposite sides of which are formed recesses $c^8$, and the sleeve $c^4$ is provided with corresponding lugs or projections $c^9$, which are adapted to enter said recesses. The seat or saddle $d$ is connected with the sleeve $c^4$ by a band $d^2$ and set-screw $d^3$ or in any other preferred manner. When the seat or saddle $d$ is in position for use, as shown in Fig. 1, the lugs or projections $c^9$ enter the recesses $c^8$ in the forwardly-directed portion $c^7$ of the head $c^2$ of the tube $c$, and the sleeve $c^4$ is locked in this position by the nut $c^5$; but by removing the said nut and sliding the sleeve $c^4$ forwardly the said sleeve and the seat or saddle $d$ may be turned on the shank $c^3$, as and for the purpose hereinafter described.

The central bore of the tube $c$, which constitutes the seat-post, extends through the head $c^2$ of said tube, and I also provide a supplemental tube $e$, which is adapted to be inserted downwardly through the head $c^2$ of the tube $c$ and through said tube, and this tube $e$ is provided at its upper end with a nut-shaped head $e^2$ and at its lower end with a reduced and screw-threaded extension $e^3$.

The lower end of the tube $c$, which constitutes the seat-post, is split longitudinally at its opposite sides to form slots $f$, as shown in Fig. 3, and the inner walls thereof are beveled or inclined, as shown at $f^2$ in Fig. 2, and mounted on the screw-threaded extension $e^3$ of the tube $e$ is a tubular sleeve $g$, provided at its opposite sides with wedge members $g^2$, adapted to enter the slots $f$ in the tube $c$. The sleeve $g$ is screw-threaded internally to correspond with the thread on the reduced portion $e^3$ of the tube $e$ and the outer walls of the upper end of said sleeve $g$ are beveled or inclined to correspond with the inner walls $f^2$ of the lower end of the tube $c$, and by turning the tube $e$ by means of the head $e^2$ thereof the sleeve $g$ will be moved upwardly or downwardly on the screw-threaded extension $e^3$ thereof, according to the direction in which said tube $e$ is turned. When the sleeve $g$ is moved upwardly, the wedge members $g^2$ thereof will be forced into the slots $f$ in the tube $c$ and the sides of said tube will be forced outwardly and caused to tightly bind the inner walls of the tubular frame member $a$, and when said sleeve $g$ is moved downwardly this operation will be reversed and by means of this construction the seat-post $c$ may be adjusted to any desired point and the seat or saddle may thus be raised or lowered whenever necessary.

The upper end of the tube $e$ is provided with a screw-threaded extension $h$, on which is placed a screw-threaded cap $h^2$, and passing downwardly through the tube $e$ and into the lower end of the tubular frame member $a$ is a piston-rod $i$, screw-threaded at its upper end, as shown at $i^2$, and adapted to receive a handle $i^3$. The lower end of the piston-rod $i$ is provided with a piston $i^4$, and the tubular frame member $a$ serves as the cylinder of an air-pump and is provided near its lower end with a nozzle $i^5$, adapted to receive a flexible tube $j$ by means of which the pneumatic tires $k$ may be inflated whenever desired, the connection of the tube $j$ with the tires $k$ being indicated at $k^2$. It will be understood that the tube $j$ may be wrapped on the frame member $a$ and secured thereto, as shown at $j^2$ in Fig. 1, or said tube may be taken off and carried in a tool-bag $m$, and the handle $i^3$ of the piston-rod $i$ may also be carried in said tool-bag.

Air may be admitted to the frame member $a$, which constitutes the cylinder of an air-pump, in any desired manner, and this air may be admitted through the tube $e$, if desired, and the piston $i^4$ may be so formed as to allow the air to pass therethrough, and when it is not desired to inflate the tires the handle $i^3$ is removed from the piston-rod $i$ and the said rod is forced down into the position shown in Fig. 2, and the cap $h^2$ is screwed into position.

A spring $n$ is placed in the bottom of the tubular frame member $a$, which constitutes the cylinder of the air-pump, and this spring when the cap $h^2$ is removed forces the piston-rod $i$ upwardly and outwardly and the handle $i^3$ may be connected therewith, and it will be understood that the spring $n$ does not interfere with the operation of the tubular frame member $a$ as the cylinder of an air-pump.

The object of providing the seat or saddle support herein shown and described is to enable the operator to turn the seat or saddle when he desires to operate the tire-inflating apparatus, and when this has been done the seat or saddle may be turned back into its normal position and secured therein by the nut $c^5$.

Having fully described my invention, what I claim as new, and desire to secure by Letters Patent, is—

1. In an apparatus of the class described, a seat-support for bicycles adapted to be connected with an upright tubular frame member which is open at the upper end, comprising a tubular post open at both ends and adapted to be passed downwardly into said frame member, said tubular post being provided at its upper end with a forwardly-directed seat-support, a turnable seat-holder mounted thereon, means for locking said seat-holder in position for use, said tubular frame member being also adapted to serve as an air-cylinder for an air-pump, a supplemental tube inserted into said tubular post and open at both ends and provided at its upper end with an enlarged head and with a screw-threaded extension, a cap for closing said extension, means whereby the turning of the supplemental tube will lock the tubular post in the frame member, a piston-rod passing downwardly through the supplemental tube and into the frame member and provided at its lower end with a piston, and a spring placed in the lower end of the frame member and on which the piston is adapted to bear and means for placing the lower end of the frame member in communication with the tires of the bicycle, substantially as shown and described.

2. The combination with the seat-post tube of a bicycle-frame having a pump therein, of a saddle-post in the tube and having an expansible end, and a pump-rod guide longitudinally disposed within the saddle-post and having means for expanding the post against the tube.

3. The combination with the seat-post tube of a bicycle-frame having a pump therein, of a hollow seat-post in the tube having an expansible terminal, a tubular pump-rod guide in the hollow post and means on the end of the guide for expanding the post.

4. The combination with the seat-post tube of a bicycle, of a pump therein, an expansible tubular seat-post fitted within the tube, and a combined seat-post expander and pump-rod guide carried within the seat-post and accessible externally thereof for adjustment to clamp and release the seat-post with respect to the tube, the pump-rod working in the guide independently of the seat-post.

5. The combination with the seat-post tube of a bicycle, of a pump within the tube, a tubular seat-post in the tube and capable of being expanded to clamp upon the seat-post tube, an expander working within the expansible seat-post and provided with a screw-threaded opening, and a tubular pump-rod guide member which has an adjustable screw-threaded connection with the screw-threaded expander, and is capable of rotation to work the expander within the seat-tube, the pump-rod working through the expander and the pump-rod guide and operable independently of said members.

6. The combination with the seat-post tube of a bicycle, of a pump in the tube, a seat-post in the tube, a pump-rod guide in the post, and means for coöperating with the guide for holding the latter rigid to the post and for fastening the post to the tube.

In testimony that I claim the foregoing as my invention I have signed my name, in presence of the subscribing witnesses, this 3d day of September, 1903.

JOSEPH F. SCANLAN.

Witnesses:
F. A. STEWART,
C. E. MULREANY.